(12) United States Patent
Heirendt et al.

(10) Patent No.: US 10,591,013 B2
(45) Date of Patent: Mar. 17, 2020

(54) LUBRICATION MECHANISM DESIGN FOR AIRCRAFT LANDING GEAR BEARINGS

(71) Applicant: Safran Landing Systems Canada Inc., Ajax (CA)

(72) Inventors: Laurent Heirendt, Brachtenbach (LU); Hugh H. T. Liu, Toronto (CA); Phillip Wang, Ajax (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 449 days.

(21) Appl. No.: 15/622,863

(22) Filed: Jun. 14, 2017

(65) Prior Publication Data

US 2018/0363723 A1    Dec. 20, 2018

(51) Int. Cl.
*F16F 7/09* (2006.01)
*F16C 29/02* (2006.01)
*F16C 33/10* (2006.01)
*F16F 7/112* (2006.01)

(52) U.S. Cl.
CPC .............. *F16F 7/09* (2013.01); *F16C 29/025* (2013.01); *F16C 33/10* (2013.01); *F16F 7/112* (2013.01); *F16C 2240/30* (2013.01); *F16C 2326/05* (2013.01); *F16C 2326/43* (2013.01)

(58) Field of Classification Search
CPC . F16F 7/09; F16F 7/112; F16C 29/025; F16C 33/10; F16C 2240/30; F16C 2326/05; F16C 2326/43
See application file for complete search history.

(56) References Cited

U.S. PATENT DOCUMENTS

| 6,974,108 | B2 | 12/2005 | Fondriest |
| 8,459,417 | B2 | 6/2013 | Masson et al. |
| 8,998,133 | B2 | 4/2015 | Cottet |
| 2003/0015830 | A1* | 1/2003 | Miller .................... B60G 15/08 267/140.11 |

(Continued)

OTHER PUBLICATIONS

Heirendt, L., "Characteristic Aircraft Landing Gear Thermo-Tribo-Mechanical Model," Proceedings of the ASME 2012 International Mechanical Engineering Congress & Exposition, Nov. 9-15, 2012, 6 pages.

(Continued)

*Primary Examiner* — Rodney A Bonnette (74) *Attorney, Agent, or Firm* — Christensen O'Connor Johnson Kindness PLLC (57) ABSTRACT

A shock absorber with lubricated bearings for an aircraft landing gear includes a piston that is received in a cylinder, and an upper bearing fixed to the piston that slidably engages an inner surface of the cylinder. A lower bearing extends inwardly from a lower portion of the cylinder and engages an outer surface of the piston. The lower bearing has a center axis and defines an annular bearing surface configured to slidably engage the piston outer surface. The annular bearing surface has a first portion that extends circumferentially more than one hundred eighty degrees about the center axis at a constant radius, defining a circular annular segment. A second portion closes the circular annular segment and defines a shallow channel or pocket in the annular bearing surface. In some embodiments the lower bearing further comprises oppositely disposed frustoconical thrust portions.

18 Claims, 5 Drawing Sheets

(56) References Cited

U.S. PATENT DOCUMENTS

2006/0078239 A1    4/2006   Dimofte
2007/0194172 A1    8/2007   Luce et al.
2012/0199421 A1    8/2012   Clarens et al.

OTHER PUBLICATIONS

Heirendt, L., et al., "Aircraft Landing Gear Thermo-Tribomechanical Model and Sensitivity Study," Journal of Aircraft vol. 51, No. 2, Mar.-Apr. 2014, pp. 511-519.

Pelosi, M., and Ivantysynova, M., "A Novel Fluid-Structure Interaction Model for Lubricating Gaps of Piston Machines," WIT Transactions on the Built Environment, vol. 105, 2009, pp. 13-24.

* cited by examiner

LUBRICATION MECHANISM DESIGN FOR AIRCRAFT LANDING GEAR BEARINGS

BACKGROUND

Airlines operating in airports having rough runways have experienced serious in-service overheating issues in landing gear of commercial aircraft. Conventional aircraft landing gear is severely challenged during landings, take-offs, and taxiing on rough runways due to the combination of high sliding speeds and high drag loads on the landing gear bearings. However, it is not always practical or cost-effective to maintain runways to preclude rough runway conditions. Low passenger traffic, restricted budgets, and unexpected weather or other challenges can interfere with planned maintenance and repaving projects. Runways and taxiways degrade over time and construction methods, manufacturing procedures, and the availability of maintenance equipment can vary greatly from region to region.

A coherent and sufficient numerical model for predicting, understanding and studying the thermal behavior of the landing gear shock absorber has recently been developed. The analysis methodology relies on a novel analytical mathematical development implemented in a computer-aided simulation framework. For the last 40 years, Computational Fluid Dynamics and the Finite Element Method have been used for many different purposes beyond the application to in-service issues. Efforts to develop a thermo-tribomechanical model of the landing gear shock absorber have been focused on the lower bearing-piston interface where the findings have typically suggested overheating as a primary cause of failure.

In order to prevent in-service overheating issues, it might seem obvious to re-pave or repair runways in certain regions of the world. However, due to various factors such as low passenger traffic and/or limited budget, many regional airports may not be equipped to implement the maintenance standards of heavily frequented airports in other parts of the world.

Therefore, advances in landing gear design to improve reliability, and in particular improvements in landing gear shock absorber systems, are needed.

Overheating bearings are common in other machinery, such as in rotors. Modified bearing geometries, such as the lemon-bore bearing, have been explored. Such studies consider the thermo-elasto-hydrodynamic (TEHD) performance of the bearings. In a TEHD lubrication regime, the heat generation is mainly influenced by the clearance between the contacting surfaces. Compressible lubricants, such as in gas-lubricated bearings, have also been considered. However, the results for rotating machinery are not applicable to the configuration of a slider bearing in a landing gear shock absorber.

Efforts undertaken to address the issues of excessive heat generation in landing gear sliding bearings may be categorized into three strategies: (i) allow the heat generation, but focus on improving the heat evacuation; (ii) withstand the heat generation by improving the material characteristics; or (iii) reduce the heat generation by reducing the bearing friction coefficient, loads, or sliding speed.

Strategies to allow the heat generation may not lead to a significant improvement as the heat generated at the lower bearing interface is concentrated locally and only slowly leaves the zone around the lower bearing. Although materials with higher thermal conductivity and eventual external cooling could lead to improved heat evacuation, the structural characteristics of the system might be changed and the overall weight of the landing gear might increase.

Strategies to withstand the heat generation are impractical for landing gear lower bearings, but are sometimes applied in applications where high amplitude shock-loads (rapidly varying contact pressure) do not occur. In general, the more heat resistant a material is, the less ductile it is. The reported overheating issues must be solved without compromising the structural integrity of the landing gear.

Strategies that reduce heat generation, however, are promising in the context of landing gear lower bearings. Reducing frictional heat generation requires reducing the bearing friction coefficient. In simple terms, the bearing friction coefficient can be reduced either through improved surface characteristics without fluid film lubrication, or through an improved "lubrication mechanism." In a landing gear system, the configuration (referred to as the configuration C) of the bearing, which is defined by the materials and the geometry, dominates the design, as the input speeds and loads cannot be changed for a given rough runway.

The most promising strategy is to alter the geometry of the configuration C between the lower bearing and the piston, which can be designed for optimal bearing performance. The practice of optimizing the bearing surface is often referred to as the design of the lubrication mechanism. The lubrication mechanism is critical to the design of high efficiency fluid film bearings and is highly application dependent. In practice, the design of the lubrication mechanism is often neglected, due to increased engineering time, which increases the unit development and production cost. Consequently, the most promising solution strategy is the optimization of the lubrication mechanism using the specifically developed computer-aided framework.

In order to prevent thermal issues, it is important to understand the thermo-tribomechanical behavior of an aircraft landing gear shock absorber, and the transient process of heat generation in a phase-changing grease-lubricated lower (slider) bearing.

Figure 1:
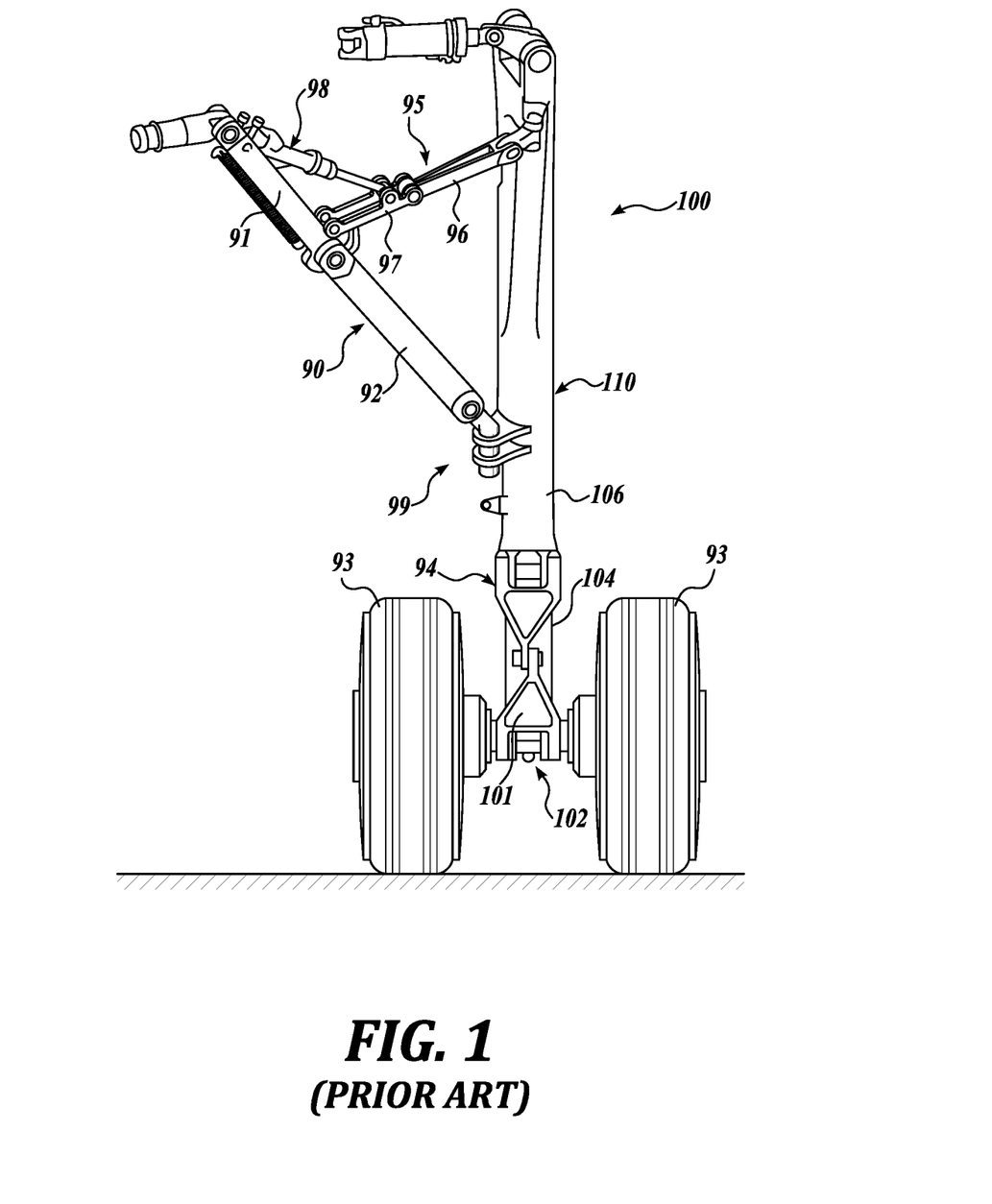
FIG. 1 illustrates a prior art landing gear for an aircraft.

A conventional main landing gear 100 (e.g., a multi-wheel single-axle main landing gear) is illustrated in isolation in FIG. 1. The landing gear 100 includes a main shock absorbing strut or shock absorber 110 having a lower end 101 attached to an axle 102 mounting two wheels 93, and configured to be pivotally connected to an airframe (not shown). For example, the shock absorber 110 may have a hybrid pneumatic and hydraulic function, sometimes referred to as an oleo strut (or oleo pneumatic strut). The oleo strut includes a piston 104 operatively coupled to the axle 102 and a cylinder 106 that slidably receives the piston 104 and is operatively coupled to the airframe. The piston 104 and cylinder 106 may be connected with a conventional scissors or torque link assembly 94.

Typically the shock absorber 110 is filled with a compressible gas and an incompressible fluid. For example, the gas may be nitrogen which is relatively inert, and the fluid may be of hydraulic kind. When the wheels 93 engage the ground during landing, the aircraft momentum and weight force the piston 104 to slide upwardly in the cylinder 106 compressing the gas and displacing the lubricant. The gas acts as a spring, elastically absorbing some of the energy of the landing. The piston 104 forces hydraulic fluid through flow restrictions in the shock absorber 110, thereby dissipating energy as work and heat, and reducing the tendency of the aircraft to rebound or bounce during landings.

The landing gear 100 shown in FIG. 1 includes a stay 90 having an upper link 91 that is pivotally attached to a lower link 92. The stay 90 extends during deployment of the landing gear 100, and secures the main fitting of the shock absorber 110 in the deployed position. The upper end of the stay 90 is operatively attached to the airframe, and the lower end of the stay 90 is attached near a lower end of the cylinder 106 of the shock absorber 110 in a Cardan joint 99.

A lock stay 95 is also shown, and includes a first link 96 that is pivotally connected to a second link 97. An opposite end of the first link 96 is pivotally connected near an upper end of the cylinder 106, and an opposite end of the second link 97 is pivotally connected to the upper link 91 of the stay 90, near the connection to the stay lower link 92. A downlink actuator 98 is pivotally connected near an upper end of the stay upper link 91, and pivotally connected to the lock stay second link 97.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A shock absorber for an aircraft landing gear includes a piston with an outer surface, a cylinder configured to receive the piston, an upper bearing fixed to the piston that slidably engages an inner surface of the cylinder, and a lower bearing extending inwardly from a lower portion of the cylinder defining an annular bearing surface that slidably engages the piston outer surface. The annular bearing surface has a first portion comprising more than half the bearing surface that defines a circular annular segment, and a second portion closing the circular annular segment defining a shallow channel or pocket in the annular bearing surface.

In an embodiment the shallow channel or pocket is oriented parallel to the axis of the circular annular segment.

In an embodiment the width of the shallow channel or pocket extends circumferentially between 45 degrees and 180 degrees, in another embodiment the width of the shallow channel or pocket extends circumferentially between 60 degrees and 120 degrees, in another embodiment the width of the shallow channel or pocket extends circumferentially between 80 degrees and 100 degrees.

In an embodiment the shallow channel or pocket has a maximum depth that is less than five percent of the radius of the first portion of the annular bearing surface, and in another embodiment the shallow channel or pocket has a depth that is less than one percent of the radius of the first portion of the annular bearing surface.

In an embodiment the annular bearing surface further includes oppositely disposed frustoconical end (thrust) portions.

In an embodiment the piston is configured to be connected to a ground engaging member, for example a wheel assembly, and the cylinder is configured to be operatively connected to an airframe.

An aircraft landing gear includes a ground-engaging carriage, a strut including a shock absorber having a piston and a cylinder configured to receive the piston. The piston is operatively connected to the carriage and a deployable stay attaches the cylinder to the airframe. The shock absorber further includes an upper bearing fixed to the piston that slidably engages an inner surface of the cylinder and a lower bearing extending inwardly from a lower portion of the cylinder defining an annular bearing surface configured to slidably engage the piston outer surface. The annular bearing surface has a first portion extending circumferentially more than one hundred eighty degrees about the center axis at a constant radius such that the first portion defines a circular annular segment, and a second portion closing the circular annular segment defining a shallow channel or pocket in the annular bearing surface.

In an embodiment the shallow channel is oriented parallel to the center axis.

In an embodiment the width of the shallow channel extends circumferentially between 45 degrees and 180 degrees, in another embodiment the width of the shallow channel extends circumferentially between 60 degrees and 120 degrees, in another embodiment the width of the shallow channel extends circumferentially between 80 degrees and 100 degrees.

In an embodiment the shallow channel has a maximum depth that is less than five percent of the radius of the first portion of the annular bearing surface, and in another embodiment the shallow channel has a maximum depth that is less than one percent of the radius of the first portion of the annular bearing surface.

In an embodiment the annular bearing surface further includes oppositely disposed frustoconical end (thrust) portions.

In an embodiment the piston is configured to be connected to a ground engaging member, for example a wheel assembly, and the cylinder is configured to be operatively connected to an airframe.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 2:
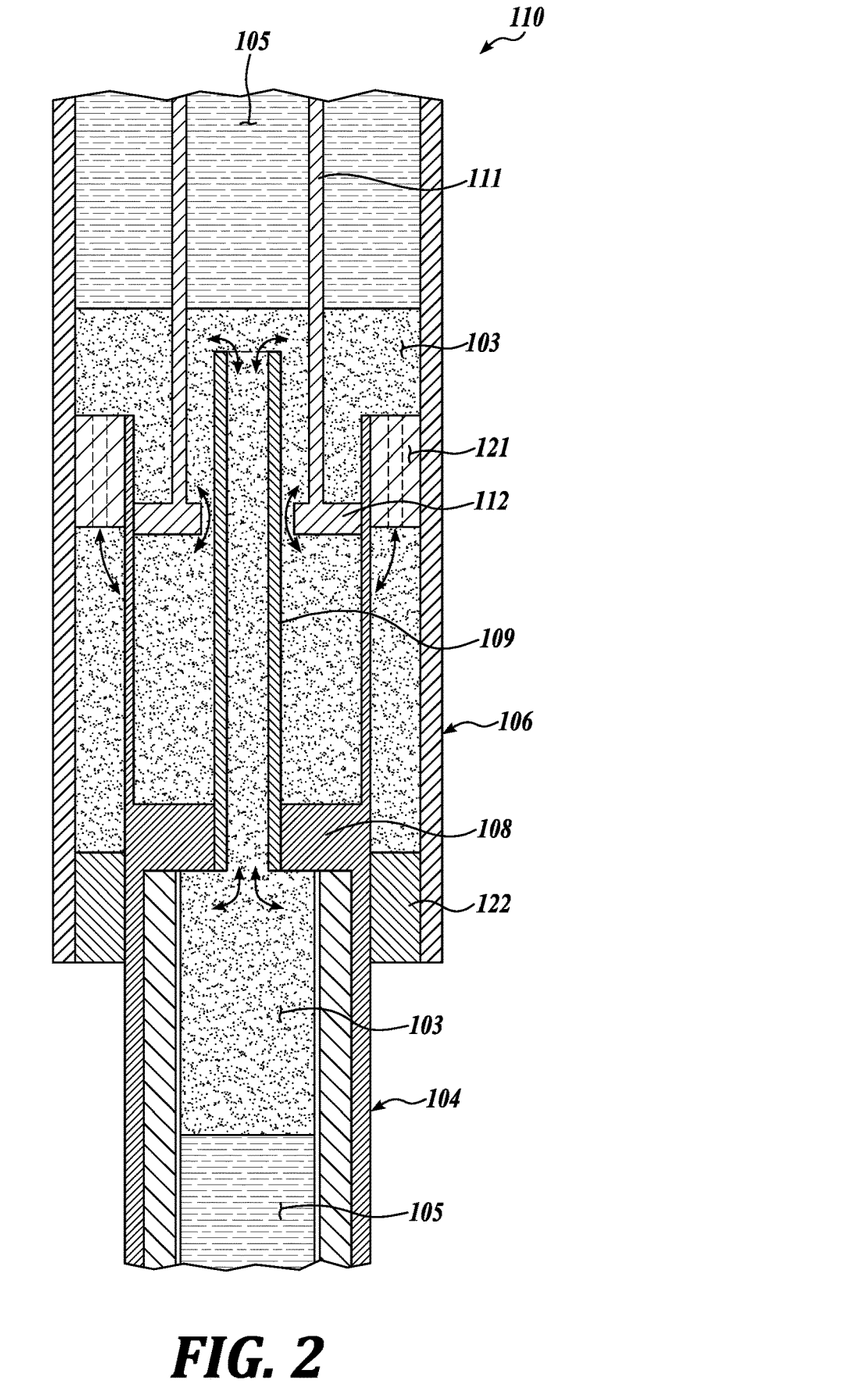
FIG. 2 is a diagrammatic sectional illustration of a portion of a landing gear shock absorber in accordance with the present invention.

FIG. 2 illustrates diagrammatically a sectional view of a middle portion of the landing gear shock absorber 110, in accordance with the present invention.

The two major components of a landing gear shock absorber 110 are the cylinder 106 which may be operatively attached to the airframe structure, and the piston 104 which may be operatively attached to a ground-engaging assembly, e.g., axle 102. The piston 104 extends into, and slidably engages, the cylinder 106. Typically, the cylinder 106 and piston 104 contain a fluid, typically a hydraulic oil that is forced through channels or orifices to dissipate mechanical energy (damped response), and a compressible gas, for example nitrogen, to provide an elastic response.

The piston 104 slidably engages the cylinder 106, and is supported by an annular upper bearing 121 and an annular lower bearing 122. The upper and lower bearings 121, 122 are lubricated slider bearings. The upper bearing 121 is fixed to the piston 104 and slidably engages an inner surface of the cylinder 106, and the lower bearing 122 is fixed to or retained by the cylinder 106 and slidably engages an outer surface of the piston 104. In this embodiment, the piston 104 includes a conventional inwardly-extending annular piccolo tube base 108, and an upwardly extending piccolo tube 109, that passes through a fixed orifice plate 112 on a support tube 111. The portion of the piston 104 inside the cylinder 106 is submerged in the hydraulic fluid 103. Typically, portions of the piston 104 and the cylinder 106 are filled with a gas 105, typically nitrogen gas (eventual mechanical divisions not shown).

The largest portion of the dissipation of the mechanical energy during ground maneuvers, take-offs and landings is accomplished by forcing the hydraulic oil 103 through orifices (indicated by arrows in FIG. 2) in the shock absorber 110. Another significant portion of the mechanical energy is dissipated through mechanical friction within the shock absorber 110 at the upper and lower bearings 121, 122. The heat generated at the interfaces of the bearings 121, 122 (interfacing with the cylinder 104 and piston 106 respectively) flows into the cylinder 106 and the piston 104. Excessive heating may cause damage to the shock absorber 110. The hydraulic oil 103 passing through the orifices produces turbulent jets, in which mechanical energy is dissipated.

Conventional landing gear systems are designed and engineered to allow for a rapid compression and extension during landings, with a relatively large stroke amplitude of the shock absorber 110. This large stroke motion, however, typically occurs once per landing of the aircraft. On rough runways, the shock absorber 110 undergoes a large number of cyclical compressions and extensions. The mechanical, tribological, and thermal responses of the shock absorber 110 are closely coupled. The thermo-tribomechanical response of the shock absorber 110 cannot be neglected for maneuvers on rough runways. An overall computational framework that couples the thermo-, tribo-, and mechanical responses of the shock absorber 110 is described in Heirendt, Laurent et al., "Aircraft Landing Gear Thermo-Tribomechanical Model and Sensitivity Study", Journal of Aircraft, Vol. 51, No. 2, (March-April 2014), which is hereby incorporated in its entirety.

A comprehensive computational model that incorporates structural deformation, the temperature fields within the fluids and the structure, and other fluid and tribology properties was developed to understand the lubrication mechanism. It was found important to consider full fluid-structure interactions and to model the grease flow in order to correctly quantify the heat generation at the bearing sliding interface. The structural deformation of the lubrication gap has a significant impact on the contact pressure profile and temperature field at the lower bearing. For example, the structural deformation is higher for a grease-lubricated bearing than for an oil-lubricated bearing. Although the clearance is reduced by the presence of grease plug flow, the structure deforms such that the hydrodynamic pressure is reduced more for a grease-lubricated than for an oil-lubricated bearing. The overall friction coefficient is also different for oil-lubricated and grease-lubricated bearings. However, the hydrodynamic pressure profile (pressure distribution) is similar for both oil-lubricated bearings and for grease-lubricated bearings, although the maximum pressure is different.

Importantly, it was found that the temperature field at the surface of prior art pistons is noticeably greater than the temperature field at the corresponding bearing surface. The heat stagnates on the piston side, whereas the heat dissipates radially and quickly on the bearing side. This asymmetrically distributed temperature field is believed to be responsible for the reported uneven heat damage on the piston within the lower bearing region.

Figure 3A:
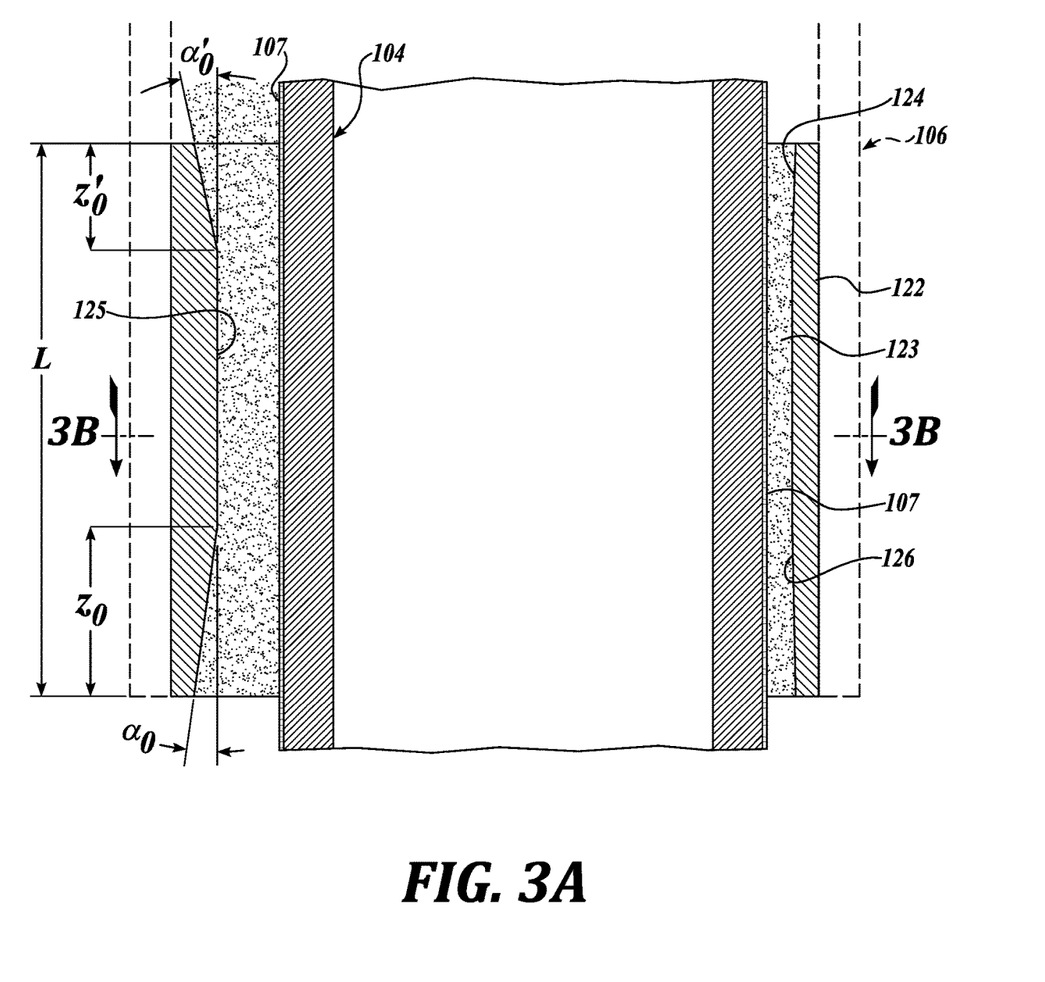
FIG. 3A is a detail longitudinal sectional view of the shock absorber in accordance with the present invention, illustrated not to scale in order to emphasize novel aspects of the shock absorber, through section 3A-3A indicated in FIG. 3B, and showing a portion of the shock absorber including the lower slider bearing.
Figure 3B:
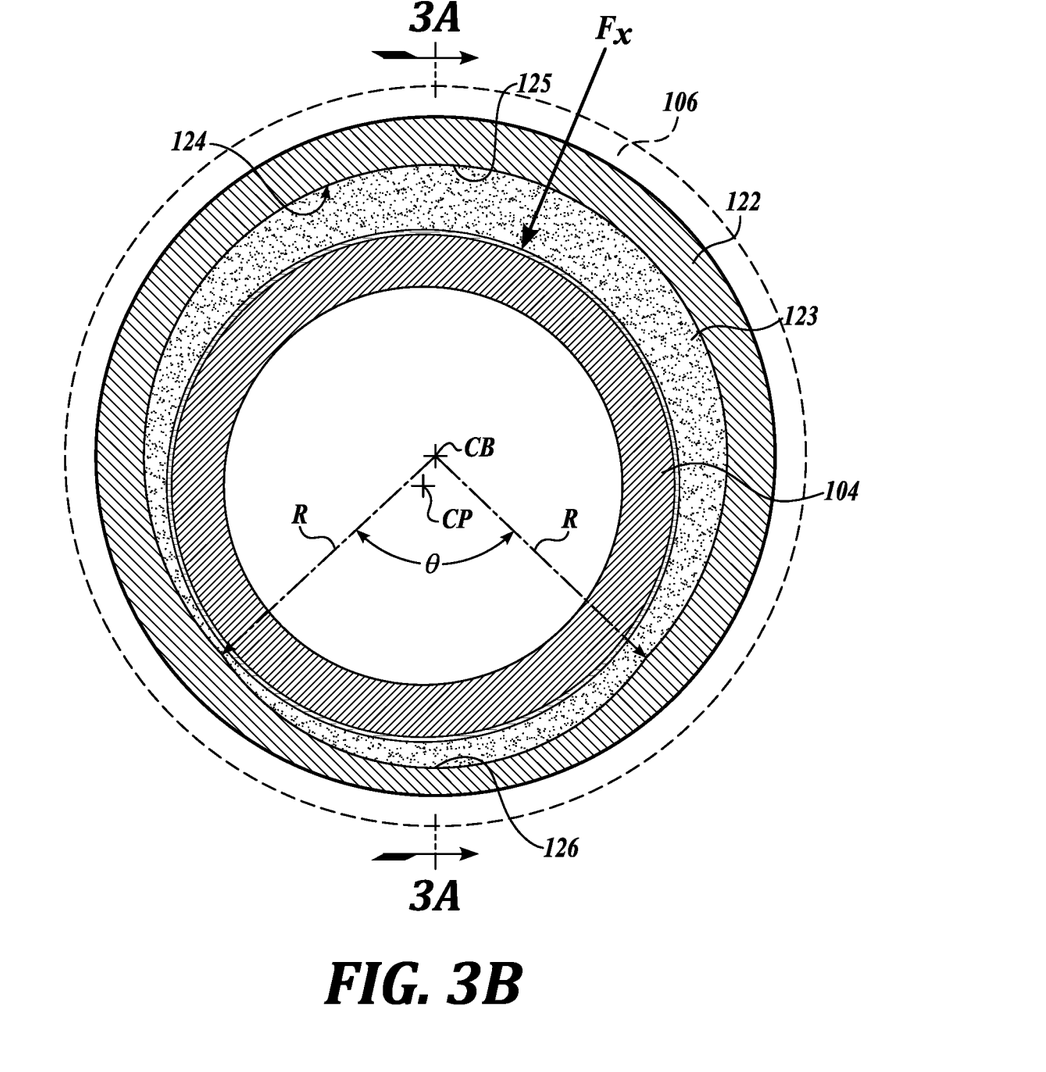
FIG. 3B is a detail transverse sectional view of the shock absorber shown in FIG. 3A through section 3B-3B indicated in FIG. 3A (not to scale)

Refer now to FIGS. 3A and 3B, which illustrate the lower bearing 122 configuration in accordance with the present invention (not to scale). FIG. 3A illustrates a vertical cross section (through section 3A-3A indicated in FIG. 3B) of the lower bearing 122 disposed around the piston 104, having an outer coating layer 107. A lubricated region 123 is shown between the piston 104 and the lower bearing 122. A transverse section of the lower bearing 122 through section 3B-3B indicated in FIG. 3A is shown in FIG. 3B. It will be appreciated by persons of skill in the art that the illustration is not to scale, in order to facilitate understanding of particular aspects of the lower bearing 122. In particular, the width of the annular lubricated region (clearance) between the lower bearing 122 and the piston 104 is greatly exaggerated. Also, the departure from a right circular cylindrical of the inner (bearing) surface of the lower bearing 122 is greatly exaggerated.

The piston 104 and lower bearing 122 are in general not concentric due to manufacturing tolerances and an externally applied force $F_x$ applied to the piston 104, for example as might be encountered during aircraft landings and/or taxiing. As shown in FIG. 3B, the piston 104 axis CP is disposed below and to the left of the lower bearing 122 axis CB, in response to the external force $F_x$ directed generally in the same direction. The relative position of CP and CB will vary depending on the magnitude and direction of F.

The inner surface or bearing surface 124 of the lower bearing 122 slidably engages the piston 104 through the lubricant 123. A first circumferential portion 125 of the bearing surface 124, (i.e., the arc of 360-θ degrees in FIG. 3B) defines a circular portion of the bearing surface 124 having a constant radius R from the bearing axis CB. A second circumferential portion of the bearing surface 124 (having a width in the angular range θ) is disposed radially further from the bearing axis CB than R, defining a shallow channel or recess 126 in the bearing surface 124. For example, the angular range θ may be between 45 degrees and 180 degrees, in another example the angular range θ is between 60 degrees and 120 degrees, in another example the angular range θ is between 80 degrees and 100 degrees. As noted above, FIGS. 3A and 3B are not to scale. In particular, the depth of the shallow channel or recess 126 is exaggerated in order to better understand the invention. In some embodiments the maximum depth of the shallow channel or recess 126 is less than five percent of the radius R of the circular first circumferential portion 125 of the bearing surface 124. In some embodiments the maximum depth of the shallow channel or recess 126 is less than one percent of the radius R.

Without the shallow channel or recess 126 the pressure response in the lubricant 123 was found to have a single peak at a location directly opposite the applied force $F_x$. Lubricant 123 in this high pressure zone tends to escape causing a low clearance (lubricant film thickness) that may only barely support the applied load, and hence leads to excessive heat generation. The shallow channel or recess 126 located generally opposite to the applied force $F_x$ has been found to result in two pressure peaks located near either side of the shallow channel or recess 126. The separated pressure peaks are lower in magnitude than the single pressure peak produced by a conventional lower bearing, but the overall load-bearing capacity is preserved. Importantly the pressure variation over a wide region of the lubricating layer 123 between peak pressures is relatively small. By separating the pressure peak into two distinct peaks, the resulting pressure profile hinders the lubricant from escaping the high pressure zone. It has been found that in order to reduce the heat generation it is beneficial to reduce the pressure gradient in the high pressure region, because the gradient of the pressure is directly proportional to the heat generation. In simple terms, less heat is generated with a lower pressure gradient (low fluid shear stress).

For a lower bearing 122 that is grease-lubricated separating the pressure peaks preserves the lubricant in a "pocket" (shallow channel or recess 126) between the pressure peaks, allowing for a cushion of grease to form between the pressure peaks. Grease in the pocket 126 is not sheared sufficiently to flow, and is therefore more likely to remain stationary in the pocket 126, preserving a lubricated contact while maneuvering on rough runways.

As seen most clearly in FIG. 3A, the bearing 122 optionally includes a first angled region Z0 wherein the gap between the bearing 122 and the piston 104 expands near the bottom of the bearing 122, and a second angled region Z'0 near the top of the bearing 122. The first angled region Z0 is referred to as the thrust region, and is known in the art. The thrust portion is responsible for hydrodynamic pressure generation during the shock absorber 110 compression. In simulations, the lubricant velocity at the thrust portion is relatively low, and may even drop to zero, and a recirculation zone can be found. In studies by the present inventor, the shear stress field within the grease lubricant in the thrust portion Z0 is practically constant along the circumference of the bearing 122. At the thrust portion Z0 grease plug flow exists, wherein the fluid flow velocity is zero.

However, in rough runway conditions, the shock absorber 110 is frequently compressed and extended, with the result that a single thrust portion Z0, responsible for the hydrodynamic pressure generation within the lubricant during compression of the shock absorber, fails to generate hydrodynamic pressure during extension of the shock absorber. Therefore, as seen most clearly in FIG. 3A a second, oppositely disposed thrust portion Z'0 may be provided at a top end of the bearing 122. As indicated in FIG. 3A, it will be appreciated that the angles α0 and α'0, and the length of the thrust portions Z0 and Z'0 may be independently designed. The first (lower) thrust portion Z0 accommodates the compression cycle or motion of the shock absorber 110, which is much more rapid than the extension cycle, which will be accommodated by the second (upper) thrust portion Z'0.

Figure 4A:
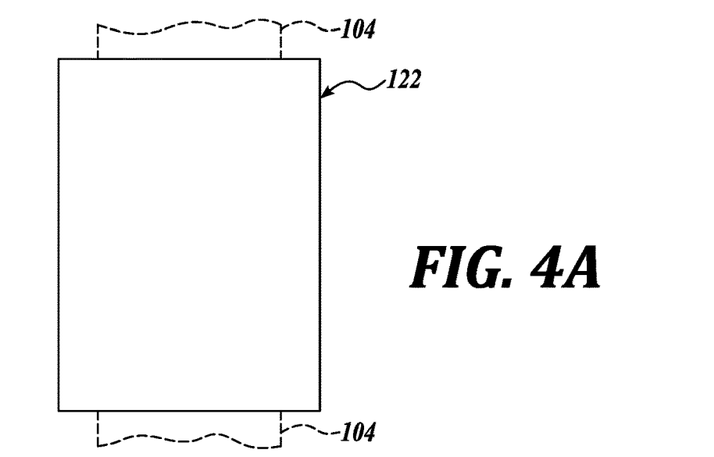
FIG. 4A is a front view of a slider bearing in accordance with the present invention.
Figure 4B:
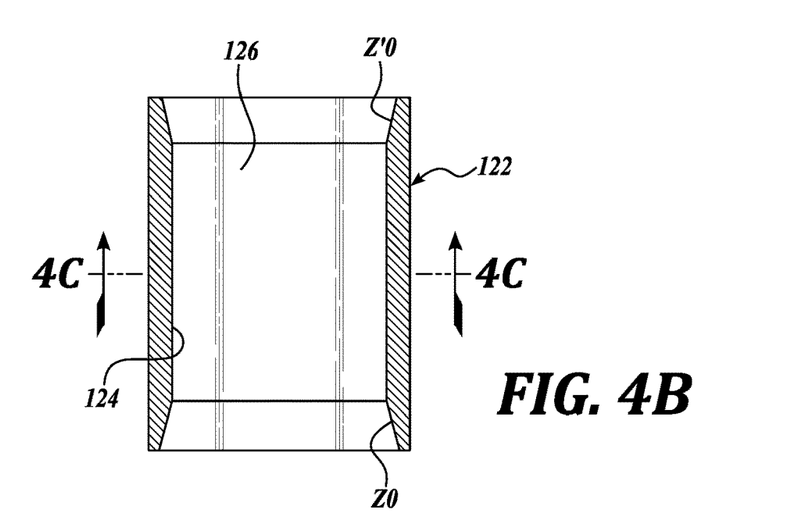
FIG. 4B is a longitudinal sectional view of the slider bearing shown in FIG. 4A.
Figure 4C:
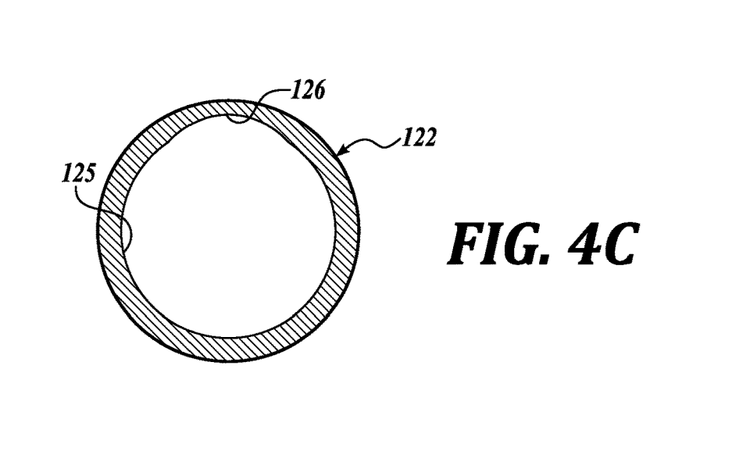
FIG. 4C is a transverse sectional view of the slider bearing shown in FIG. 4A (not to scale).

FIG. 4A shows a front view of the lower bearing 122 with the shock absorber piston 104 indicated in phantom. A vertical sectional view of the lower bearing 122 is shown in FIG. 4B through the center section. The bearing 122 includes the longitudinal shallow channel or pocket 126 extending along the length of the bearing surface 125. Upper and lower thrust regions Z'0, Z0 are provided. FIG. 4C illustrates a transverse cross section of the bearing 122 through section 4C-4C indicated in FIG. 4A with the depth of the shallow channel or recess 126 (not to scale).

While illustrative embodiments have been illustrated and described, it will be appreciated that various changes can be made therein without departing from the spirit and scope of the invention.

The invention claimed is:

1. A shock absorber for an aircraft landing gear with lubricated bearings comprising:
   a piston having an outer surface;
   a cylinder configured to receive the piston;
   a lubricated upper bearing fixed to the piston and configured to slidably engage an inner surface of the cylinder; and
   a lubricated lower bearing extending inwardly from a lower portion of the cylinder, the lower bearing having a center axis and defining an annular bearing surface configured to slidably engage the piston outer surface;
   wherein the annular bearing surface comprises a first portion extending circumferentially more than one hundred eighty degrees about the center axis at a constant radius such that the first portion defines a circular annular segment, and a second portion closing the circular annular segment defining a shallow channel or pocket in the annular bearing surface.

2. The shock absorber of claim 1, wherein the shallow channel or pocket is oriented parallel to the center axis.

3. The shock absorber of claim 1, wherein the shallow channel or pocket has a width extending circumferentially between 45 degrees and 180 degrees.

4. The shock absorber of claim 1, wherein the shallow channel or pocket has a width extending circumferentially between 60 degrees and 120 degrees.

5. The shock absorber of claim 1, wherein the shallow channel or pocket has a width extending circumferentially between 80 degrees and 100 degrees.

6. The shock absorber of claim 1, wherein the shallow channel or pocket has a maximum depth that is less than five percent of the constant radius of the first portion of the annular bearing surface.

7. The shock absorber of claim 1, wherein the shallow channel or pocket has a maximum depth that is less than one percent of the constant radius of the first portion of the annular bearing surface.

8. The shock absorber of claim 1, wherein the annular bearing surface further comprises oppositely disposed frustoconical end portions.

9. The shock absorber of claim 1, wherein the piston is configured to be operatively connected to a ground engaging member and the cylinder is configured to be operatively connected to an airframe.

10. An aircraft landing gear comprising:
    a ground-engaging carriage;
    a strut comprising a shock absorber having a piston and a cylinder configured to receive the piston, wherein the piston is operatively connected to the carriage and further comprising a deployable stay configured to attach the cylinder to an airframe;
    wherein the shock absorber further comprises:
    a lubricated upper bearing fixed to the piston and configured to slidably engage an inner surface of the cylinder; and
    a lubricated lower bearing extending inwardly from a lower portion of the cylinder, the lower bearing having a center axis and defining an annular bearing surface configured to slidably engage the piston outer surface;
    wherein the annular bearing surface comprises a first portion extending circumferentially more than one hundred eighty degrees about the center axis at a constant radius such that the first portion defines a circular annular segment, and a second portion closing the circular annular segment defining a shallow channel or pocket in the annular bearing surface.

11. The aircraft landing gear of claim 10, wherein the shallow channel or pocket is oriented parallel to the center axis.

12. The aircraft landing gear of claim 10, wherein the shallow channel or pocket has a width extending circumferentially between 45 degrees and 180 degrees.

13. The aircraft landing gear of claim 10, wherein the shallow channel or pocket has a width extending circumferentially between 60 degrees and 120 degrees.

14. The aircraft landing gear of claim 10, wherein the shallow channel or pocket has a width extending circumferentially between 80 degrees and 100 degrees.

15. The aircraft landing gear of claim 10, wherein the shallow channel or pocket has a maximum depth that is less than five percent of the constant radius of the first portion of the annular bearing surface.

16. The aircraft landing gear of claim 10, wherein the shallow channel or pocket has a maximum depth that is less than one percent of the constant radius of the first portion of the annular bearing surface.

17. The aircraft landing gear of claim 10, wherein the annular bearing surface further comprises oppositely disposed frustoconical thrust portions.

18. The aircraft landing gear of claim 10, wherein the piston is configured to be operatively connected to a ground engaging member and the cylinder is configured to be operatively connected to an aircraft.

\* \* \* \* \*